United States Patent [19]
Schmidt et al.

[11] 3,863,442
[45] Feb. 4, 1975

[54] ANNULAR SHEET AND VARIABLE AREA INJECTION

[75] Inventors: Craig M. Schmidt, Williamsville; Frank D. Bond, Jr., Buffalo, both of N.Y.; Ronald F. McKenna, Rockford, Ill.

[73] Assignee: The United States of America as represented by the Secretary of the Navy, Washington, D.C.

[22] Filed: Mar. 24, 1970

[21] Appl. No.: 24,901

[52] U.S. Cl. .............................. 60/258, 60/39.74 A
[51] Int. Cl. ............................................. F02k 9/02
[58] Field of Search ................................. 60/258

[56] References Cited
UNITED STATES PATENTS

| | | | |
|---|---|---|---|
| 2,810,259 | 10/1957 | Burdett, Jr. | 60/39.74 A |
| 3,205,656 | 9/1965 | Elverum, Jr. | 60/258 |
| 3,382,677 | 5/1968 | Novotny et al. | 60/39.74 A |
| 3,462,950 | 8/1969 | Chevalaz | 60/258 |

Primary Examiner—Samuel Feinberg
Attorney, Agent, or Firm—R. S. Sciascia; P. Schneider; M. Sturm

[57] ABSTRACT

An injector assembly for a bipropellant rocket engine having a movable deflector plate, to vary the orifice areas and propellant flow, coupled to a throat pintle to simultaneously vary the nozzle area and thereby maintain a constant pressure in the combustion chamber for all degrees of throttling. The face of the deflector plate has two annular concave surfaces to guide and form the propellants into circumferential sheets for impingement and complete propellant mixing, whether the propellants be liquid or semi-liquid, such as metallized fuel. The orifices are rectangular in cross-section to promote a constant mixture ratio of propellants over the entire throttle range and the injector is capable of complete propellant shutoff at the injector face. In addition, the injector face and chamber wall are propellant film-cooled while the thrust chamber and pintle are formed of materials to resist erosion, and promote cooling and longer life.

4 Claims, 2 Drawing Figures

INVENTORS
CRAIG M. SCHMIDT
FRANK D. BOND, JR.
RONALD F. MCKENNA

BY Thomas O. Watson Jr.

ATTORNEY

ANNULAR SHEET AND VARIABLE AREA INJECTION

STATEMENT OF GOVERNMENT INTEREST

The invention described herein may be manufactured and used by or for the Government of the United States of America for governmental purposes without the payment of any royalties thereon or therefore.

BACKGROUND OF THE INVENTION

The present invention relates generally to improvements in rocket engines, and more particularly it pertains to a new and improved injector assembly having a deflector plate with concave surfaces to form the propellants into circumferential sheets for impingement in order to achieve complete propellant mixing, effective cooling and longer chamber life.

In the field of injectors, it has been the general practice to employ a pattern of circular holes or orifices in the injector face which communicate with a supply of propellant, and a movable control element which covers and uncovers these holes, to vary the flow of propellant. Other prior art injectors have used pistons movable within the orifices to vary the propellant flow. However, injectors must also guide the propellants to form the desired streams, sprays or jets for efficient propellant impingement and mixing. To accomplish this, prior art injectors use separate means to deflect the propellants, in addition to the pistons and control elements to vary the propellant flow. This creates problems in coordination, and results in a costly and complex injector assembly.

Moreover, the prior art use of streams, sprays or jets for propellant impingement have not been completely satisfactory due to incomplete and inefficient mixing of the propellants. Similarly, the use of streams, sprays and jets have resulted in cooling problems and decreased chamber life.

The above disadvantages have been overcome by the present invention which provides a deflector plate which both varies the propellant flow and guides the propellants to form circumferential sheets in order to achieve complete propellant mixing, more effective cooling and longer chamber life.

SUMMARY OF THE INVENTION

The general purpose of this invention is to provide an injector assembly that is simple and thus economical to fabricate and yet provide high combustion efficiency with temperatures at the thrust chamber walls that are sufficiently low so that the walls can be designed to withstand the intensity.

The injector consists of an annular deflector plate having concave surfaces formed thereon, said deflector plate being fixed to the injector face and protruding generally in an axial direction. Throttling is accomplished by movement of the deflector plate which partially covers the propellant feed orifices to vary the propellant flow. The orifices are rectangular in cross-section to maintain a constant mixture ratio of propellants over the entire throttle range. Moreover, the orifices are so situated that the propellant streaming from these orifices fans out when it impinges on the concave surfaces of the deflector plate, so that as the propellant reaches the trailing edge of the deflector plate, the flow is in an annular or continuous circumferential sheet, rather than discreet streams, to promote complete propellant mixing and more effective cooling. In addition, the injector face and chamber wall are propellant film-cooled while the thrust chamber walls are formed of materials designed to successfully withstand the high temperatures and pressures of combustion, which result from using higher energy propellants.

OBJECTS OF THE INVENTION

An object of the present invention is the provision of an injector designed to insure complete propellant mixing and efficient propellant utilization in order to increase combustion temperatures and combustion efficiency over the entire throttle range.

Another object is to provide an injector to form the propellants into circumferential sheets for impingement, whether the propellants be liquid or semi-liquid, such as metallized fuel, in order to achieve complete propellant mixing.

A further object of the invention is the provision of an injector wherein the orifices permit the achievement of a constant mixture ratio of propellants over the entire throttle range, and wherein the orifices may be made larger and fewer than in conventional injectors, thereby allowing less stringent tolerance and quality control requirements.

Still another object is to provide an injector wherein the injector face and chamber wall are propellant film-cooled more effectively while maintaining high performance due to sheet penetration.

Other objects, advantages and novel features of the invention will become apparent from the following detailed description of the invention when considered in conjunction with the accompanying drawings.

DETAILED DESCRIPTION OF THE PREFERRED EMBODIMENT

Figure 1:
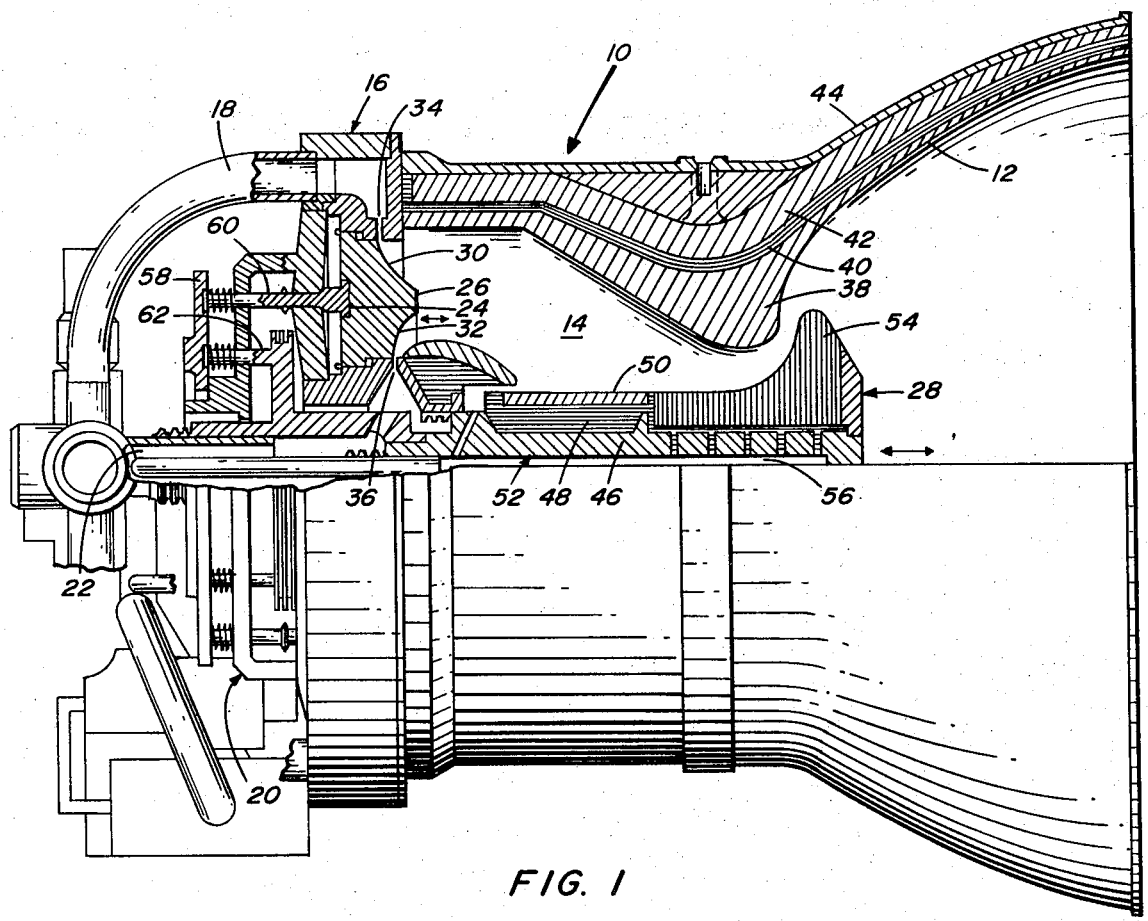
FIG. 1 is a side elevation, partly in section, of a rocket engine employing a preferred embodiment of the invention.

Referring in detail to FIG. 1 of the drawing, a bipropellant rocket engine is illustrated having an ablative thrust chamber 10, an expansion-deflection exhaust nozzle 12 and a combustion chamber 14. At the head end of the combustion chamber is an injector assembly 16 composed of fixed and movable portions. The fixed portions are a peripheral oxidizer manifold 18, a main backplate assembly 20 and a central fuel manifold 22. The movable portions are the combination annular throttle piston 24 and propellant deflector plate 26 which move in a direction opposite to a central throat pintle 28 coaxially arranged in thrust chamber 10. The deflector plate 26 is located on the front of throttle piston 24 and has two annular concave deflector surfaces 30 and 32 formed thereon. Of course, the deflector surfaces can be made removable from the injector face.

Figure 2:
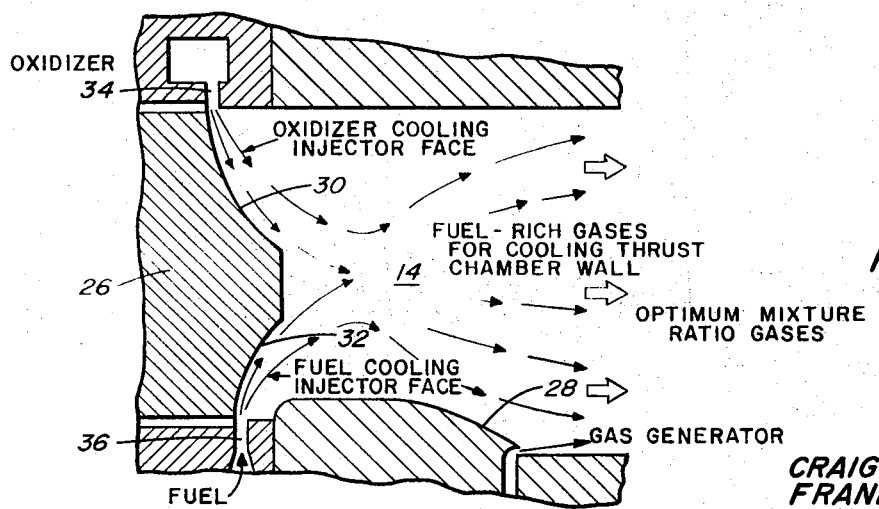
FIG. 2 illustrates the deflector plate structure of the invention.

Throttling is accomplished by the movement aft of the annular deflector plate 26 which partially covers the propellant feed orifices. Propellant shutoff is accomplished at the injector face by completely covering the orifices. The orifices are a series of radial slots with rectangular cross-section. The propellants are injected through the circumferentially spaced oxidizer injection slots 34 and fuel injection slots 36 as seen in FIG. 2.

The injector pattern consists of fifty fuel and fifty oxidizer rectangular orifices which direct their respective streams tangent to the movable annular deflector plate 26. The propellants flow over the deflector plate 26, which is composed of the concave oxidizer deflector surface 30 and the concave fuel deflector surface 32. As the propellants flow over the concave deflectors they spread out and are turned through an angle. As the propellants leave the deflectors, they spread out to form thin circumferential sheets, impinge as sheets, combust and produce thrust. The propellants may be two liquids or they may be a liquid oxidizer and a semi-liquid fuel, such as metallized fuel.

Slots were selected in lieu of round holes to maintain a constant mixture ratio during throttling. The slots also promote a fan effect which maintains a high combustion efficiency over the throttling ranges. In addition, the space between each slot is predetermined so that the fan effect from each slot is exactly adjacent to the fan effects from the adjacent slots on either side. In this manner, a continuous circumferential or annular sheet is formed by the side-by-side fan effects being circumferentially arranged. Another point in favor of rectangular orifices is that they are wide enough to permit venier thrust control with state-of-the-art tolerances.

One aspect of the invention determined whether a metallized fuel propellant [36.2 percent Dimethylformamide, 60% Al (5–9M spheres), 3.0 percent Colloidal Silica, and 0.8 percent Hydroxyethyl-cellulose] could be transformed into a sheet by a deflector plate flow. It was observed that the metallized fuel injecting out of a single orifice changes its flow geometry and flattens out into a fan effect by the time it reaches the end of the deflector plate 26. Therefore, with multiple orifices a continuous metallized fuel sheet can be formed.

The face of the deflector plate 26 is contoured to turn the propellant streams such that they impinge just downstream of the deflector. The fuel injection momentum is higher than that of the oxidizer, which partially overdrives the oxidizer sheet, and establishes a boundary layer of fuel-rich gases along the wall of the thrust chamber 10 for cooling.

A core of high temperature gases, however, is maintained in the center of the combustion chamber 14, and in order for an ablative thrust chamber to be fabricated and remain durable over the required firing duration in the CPF oxidizer/metallized fuel propellant combustion and heat soak environment, a chamber wall temperature of approximately 4600°F or less is required during operation. This temperature corresponds to a mixture ratio of 1.0, which means that upon sheet penetration, the fuel may carry along with it an amount of oxidizer corresponding to this mixture ratio. With the higher core combustion temperature resulting from CPF/metallized fuel, a fuel-rich barrier gas operating with slightly greater than 20 percent of the total flow rate is needed for fuel-rich gas cooling of the chamber wall.

Sheet penetration obtains a fuel-rich barrier zone for cooling adjacent to the chamber wall and thereby lowers the effective driving temperature of the combustion gases and the overall level of chamber wall heat flux. Thereby, more effective cooling of the thrust chamber is achieved while maintaining high performance.

The severe thermal environment to which the injector is exposed at 1000 psia chamber pressure requires positive cooling of the injector face 26 during operation. With the configuration of the present invention, film-cooling is simple and effective. As is illustrated in FIG. 2, the face of the injector is film-cooled by the propellants flowing over the deflector plate 26.

In order for the thrust chamber and pintle to remain durable and successfully withstand the high temperatures and pressures encountered as a result of using high energy propellants, the present invention provides an ablative thrust chamber design which is a composite structure, to better resist combustion heat and pressure and which is compatible with the fuel-rich cooling film. The wall of thrust chamber 10 is formed of inner layer 38 of graphite base, high erosion resistant, combustion zone material, e.g., Carbitex, which is a graphite cloth material that has been graphitized, having trace impurities; and intermediate layer 40 of graphite base insulator, e.g., Grafoil, which is a flexible form of pyrolytic graphite, having trace impurities; and a silica phenolic, e.g., Refrasil, in the outer region 42 encased in a metal shell 44 of Inconel 718. The injector assembly 16 is fabricated of Nickel-A and Inconel 718, and is welded to thrust chamber shell 44.

The design of throat pintle 28 is also a composite structure consisting of a columbium high temperature alloy center body 46, with a Grafoil intermediate layer 48 and a Carb-I-Tex 700 outer layer 50 in the cylindrical region 52. The plug portion 54 consists of stacked pyrolytic graphite wafers with spiral formed coolant passages. Both the plug portion 54 and the cylindrical region 52 of the central throat pintle 28 are gas film-cooled with fuel-rich gases from a pressurization system gas generator (not shown). This cooling gas is ducted through a central passage 56 in the pintle 28.

In the injector assembly design of the present invention, fuel is fed centrally through fuel manifold 22 and oxidizer is fed peripherally through oxidizer manifold 18. This configuration is designed to permit sheet penetration with the semi-liquid, metallized fuel and the liquid oxidizer.

The technique of sheet-penetration has resulted in remarkably low erosion rates for thrust chambers and pintles made of both ablative and pyrolytic graphite materials. Moreover, sheet-penetration is successful in achieving an effective chamber wall cooling film and increased chamber life while maintaining high performance.

The displacement of the annular throttle piston 24 and the throat pintle 28 is accomplished by utilizing cam surfaces which are machined on a cam gear 58. The cam surfaces contact extensions 60 and 62 of the throttle piston 24 and throat pintle 28, respectively. As the cam gear 58 rotates, the throttle piston 24 and throat pintle 28 are displaced in opposite directions as a result of the cam action between the extensions 60 and 62 and the cam surfaces on the face of gear 58. In this manner a constant pressure is maintained in the combustion chamber for all degrees of throttling.

It should be understood, of course, that the foregoing disclosure relates to only a preferred embodiment of the invention and that numerous modifications or alterations may be made therein. For example, the method of actuation does not have to be a cam system. Also, this invention does not have to be used with an expansion-deflection nozzle, and is by way of example only. Moreover, the throat pintle could be removed and the deflector plate used with a conventional DeLaval nozzle. The only reason for the throat pintle is to maintain a constant pressure in the combustion chamber and is not needed for the injector throttling concept of the present invention to be operative.

Obviously many modifications and variations of the present invention are possible in the light of the above teachings.

What is claimed is:

1. An injector assembly for throttling a bipropellant rocket engine having a thrust chamber comprising:

an annular deflector plate projecting into the head of the thrust chamber and movable in an axial direction to vary the propellant flow;

said deflector plate having inner and outer annular concave deflector surfaces which propellants flow over and film-cool;

radially spaced, circumferentially arranged inner and outer groups of propellant orifices formed in said injector assembly;

said inner group of orifices being arranged to inject first propellant streams to directly impinge said inner concave deflector surface and be flattened out into a fan effect whereby said first propellant streams are formed into continuous circumferential sheet as said streams spread out and reach the edge of said inner concave deflector surface;

said outer group of orifices being arranged to inject second propellant streams to directly impinge said outer concave deflector surface and be flattened out into a fan effect whereby said second propellant streams are formed into a continuous circumferential sheet as said streams spread out and reach the edge of said outer concave deflector surface; and said inner and outer concave deflector surfaces being contoured so as to guide said circumferentially formed propellant sheets to impinge and combust downstream of said deflector plate.

2. An injector assembly according to claim 1 wherein said inner and outer groups of propellant orifices are rectangular in cross-section, whereby as said deflector plate is moved to cover or uncover said rectangular orifices and vary the propellant flow rate, a constant mixture ratio of propellants is maintained.

3. An injector assembly according to claim 2 wherein the spaces between said circumferentially arranged orifices are predetermined to equal the width of a flattened propellant stream as it reaches the edge of a concave deflector surface, whereby said flattened streams are exactly adjacent to each other and cooperatively form a continuous circumferential sheet.

4. An injector assembly according to claim 3 wherein said inner and outer concave deflector surfaces are further contoured so that downstream of said deflector plate one propellant sheet overdrives the other and establishes a boundary layer of propellant to film-cool the walls of the thrust chamber.

* * * * *